(12) United States Patent
Uematsu (10) Patent No.: US 11,072,358 B2
(45) Date of Patent: Jul. 27, 2021

(54) STEERING WHEEL COVERING MEMBER, STEERING WHEEL, AND METHOD FOR MANUFACTURING STEERING WHEEL

(71) Applicant: NIHON PLAST CO., LTD., Shizuoka (JP)

(72) Inventor: Nobutaka Uematsu, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 16/247,810

(22) Filed: Jan. 15, 2019

(65) Prior Publication Data

US 2019/0241204 A1    Aug. 8, 2019

(30) Foreign Application Priority Data

Feb. 6, 2018    (JP) .............................. JP2018-019333

(51) Int. Cl.
*B62D 1/04*    (2006.01)
*H05B 3/10*    (2006.01)
(Continued)

(52) U.S. Cl.
CPC .............. *B62D 1/06* (2013.01); *B62D 1/065* (2013.01); *H05B 3/12* (2013.01); *H05B 3/34* (2013.01);
(Continued)

(58) Field of Classification Search
CPC . B62D 1/06; B62D 1/065; B62D 1/11; H05B 3/12; H05B 3/34; H05B 3/54; H05B 2203/014; H05B 2203/017
See application file for complete search history.

(56) References Cited

U.S. PATENT DOCUMENTS 5,205,186 A * 4/1993 Draxlmaier, Sr. ....... B62D 1/06
74/552
5,251,506 A * 10/1993 Itagaki .................... B29C 63/22
150/154
(Continued)

FOREIGN PATENT DOCUMENTS

DE    102013004533 A1 *  9/2014 ........... A61H 9/0007
EP    1199241 B1    10/2008
(Continued)

OTHER PUBLICATIONS

Office Action for German Patent Application No. 102019000126.5 dated Dec. 2, 2019, 19 pages.

*Primary Examiner* — Adam D Rogers
(74) *Attorney, Agent, or Firm* — Brundidge & Stanger, P.C.

(57) ABSTRACT

There is provided a steering covering member in which it is possible to dispose a wire on a grip section in a wider range while a wrinkle or a slack is suppressed, a steering wheel including the steering covering member, and a method for manufacturing the steering wheel. The steering covering member includes a sheet-shaped sheet member having extensibility and a wire held by the sheet member. The sheet member is set to have a length, in a natural length, having a corresponding relationship with an inner circumferential-side length of a rim section main body portion. Both end portions of the sheet member in the longitudinal direction are disposed at positions corresponding to recessed portions of the rim section main body portion.

5 Claims, 4 Drawing Sheets

(51) Int. Cl.
  *H05B 3/20* (2006.01)
  *H05B 3/40* (2006.01)
  *B62D 1/06* (2006.01)
  *H05B 3/12* (2006.01)
  *H05B 3/34* (2006.01)
  *H05B 3/54* (2006.01)

(52) U.S. Cl.
  CPC .......... *H05B 3/54* (2013.01); *H05B 2203/014* (2013.01); *H05B 2203/017* (2013.01)

(56) References Cited

U.S. PATENT DOCUMENTS

| | | | | |
|---|---|---|---|---|
| 6,386,063 | B1 * | 5/2002 | Hayashi | B29C 45/1671 |
| | | | | 74/552 |
| 6,386,064 | B1 * | 5/2002 | Hayakawa | B62D 1/06 |
| | | | | 74/558 |
| 6,412,365 | B1 | 7/2002 | Nagata et al. | |
| 9,248,851 | B2 * | 2/2016 | Van'tZelfde | B62D 1/046 |
| 9,272,725 | B2 * | 3/2016 | Pekari | B62D 1/046 |
| 9,352,767 | B2 * | 5/2016 | Cho | B62D 1/065 |
| 2009/0095121 | A1 * | 4/2009 | Huang | B62D 1/06 |
| | | | | 74/558 |
| 2010/0237063 | A1 | 9/2010 | Hasegawa et al. | |
| 2015/0344061 | A1 * | 12/2015 | Uematsu | B62D 1/065 |
| | | | | 219/204 |
| 2016/0009310 | A1 | 1/2016 | Seki et al. | |
| 2016/0236702 | A1 * | 8/2016 | Lammers | B26D 3/08 |
| 2019/0291770 | A1 * | 9/2019 | Uematsu | B62D 1/06 |

FOREIGN PATENT DOCUMENTS

| | | | |
|---|---|---|---|
| JP | 2002096739 A * | 4/2002 | |
| JP | 2016-016790 A | 2/2016 | |
| WO | WO-2016051772 A1 * | 4/2016 | .............. B62D 1/06 |
| WO | WO-2019098051 A1 * | 5/2019 | .............. B62D 1/06 |

* cited by examiner

STEERING WHEEL COVERING MEMBER, STEERING WHEEL, AND METHOD FOR MANUFACTURING STEERING WHEEL

CROSS REFERENCE TO RELATED APPLICATIONS

This application is entitled to and claims the benefit of Japanese Patent Application No. 2018-019333 filed on Feb. 6, 2018, the disclosure of which including the specification, drawings and abstract is incorporated herein by reference in its entirety.

TECHNICAL FIELD

The present invention relates to a steering wheel covering member that configures a grip section of a steering wheel, which is gripped and operated by a driver, in cooperation with a grip section main body portion, the steering wheel including the steering wheel covering member, and a method for manufacturing the steering wheel.

BACKGROUND ART

In recent years, an electric vehicle (EV) is widely used. The electric vehicle is configured of a combination of a rechargeable battery and a motor, and it is necessary to suppress consumption of accumulated power because energy needs to be replenished from an external charger, basically. In this respect, in order to suppress power consumption for heating (air conditioner) performed by high power consumption, a section is provided to cause warmth to be directly transmitted by a steering wheel that is directly touched by an occupant (driver). For example, a heater line as a heating element is buried in the steering wheel, and thereby it is possible to warm the steering wheel even when it is not long after a start, and various engines are not sufficiently warmed. Hence, when an automobile as a vehicle parked outside in winter is started and driven, for example, it is possible to suppress use of heating and suppress power consumption while there is a reduction in difficulty or discomfort of an operation due to a cold steering wheel.

As such a configuration, a steering wheel is known in which a heater unit provided with layout of a heater line on a sheet element is wrapped around a rim section of a cored bar or the like formed of a steering wheel base material. The rim section is formed along an arc and normally has an annular shape. Hence, when the sheet element having a substantially rectangular shape is formed to have a tubular shape and is wrapped as is, a wrinkle or a slack occurs at a position on an inner circumferential side due to a difference in length between inner and outer circumferences of the rim section, and the external appearance or tactile sensation of the rim section deteriorates. Therefore, a notch or the like is formed in sheet element, thereby, absorbing the difference in length between the inner and outer circumferences, and thereby an occurrence of the wrinkle or the slack is suppressed (for example, see PTL 1).

CITATION LIST

Patent Literature

PTL 1
Japanese Patent Application Laid-Open No. 2016-16790 (pp. 5 to 7 and FIG. 2)

SUMMARY OF INVENTION

Technical Problem

However, it is not possible to set the heater line at a position at which the notch is formed in the sheet element; thus, it is desirable to employ a configuration in which it is possible to set the heater line on the rim section in a wider range.

The present invention is made in this respect, and an object thereof is to provide a steering wheel covering member in which it is possible to perform layout of an element to be held on a grip section in a wider range while a wrinkle or a slack is suppressed, a steering wheel including the steering wheel covering member, and a method for manufacturing the steering wheel.

Solution to Problem

According to a first aspect, a steering wheel covering member that is wrapped around and fixed to a grip section main body portion which is formed along an arc and has recessed portions formed in a direction intersecting the arc and that configures a grip section of a steering wheel, which is gripped and operated by a driver, in cooperation with the grip section main body portion, the steering wheel covering member including: a sheet-shaped covering member main body; and an element to be held that is held by the covering member main body, in which the covering member main body has extensibility, has a length in a longitudinal direction, in a natural length, which is set to have a corresponding relationship with an inner circumferential-side length of the grip section main body portion, and has both end portions in the longitudinal direction at positions corresponding to the recessed portions.

According to a second aspect, a steering wheel having a grip section that is gripped and operated by a driver, in which the grip section includes a grip section main body portion that is formed along an arc and has recessed portions in a direction intersecting the arc, and the steering wheel covering member according to first aspect which covers, is wrapped around, and is fixed to the grip section main body portion.

According to a third aspect, in the steering wheel according to the second aspect, an adhesive is set on at least one of a covering member main body and the grip section main body portion in a region excluding a position corresponding to an outer circumferential side of the grip section main body portion and fixes the covering member main body.

According to a fourth aspect, a method for manufacturing a steering wheel that includes a grip section main body portion formed along an arc, a sheet-shaped covering member main body having extensibility and a length in a longitudinal direction, in a natural length, which is set to have a corresponding relationship with an inner circumferential-side length of the grip section main body portion, and a steering wheel covering member having an element to be held that is held by the covering member main body, the method including: matching positions of end portions of the covering member main body in the longitudinal direction with recessed portions formed in the grip section main body portion in a direction intersecting the arc; and wrapping the covering member main body around the grip section main body portion from a wrapping start on an inner circumferential side of the grip section main body portion to a wrapping end on the inner circumferential side thereof while the covering member main body extends on an outer circumferential side thereof and fixing the steering wheel covering member to the grip section main body portion.

According to a fifth aspect, the method for manufacturing a steering wheel according to the fourth aspect further includes setting an adhesive for fixing the covering member main body on at least any one of the covering member main body and the grip section main body portion in a region excluding a position corresponding to an outer circumferential side of the grip section main body portion.

Advantageous Effects of Invention

In the steering wheel covering member according to the first aspect, when the covering member main body has the extensibility, has the length in the longitudinal direction, in the natural length, which is set to have the corresponding relationship with the inner circumferential-side length of the grip section main body portion, thereby, being wrapped around and fixed to the grip section main body portion, both of the end portions of the covering member main body in the longitudinal direction are disposed to be matched with the positions corresponding to recessed portions of the grip section main body portion. The wrapping start of one edge portion of the covering member main body is performed along the inner circumferential side of the grip section main body portion, the covering member main body extends to be wrapped around at a position of the grip section main body portion on the outer circumferential side, and the wrapping end of the other edge portion of the covering member main body is performed on the inner circumferential side of the grip section main body portion. While the covering member main body is reliably positioned on the grip section main body portion by using the recessed portions, the covering member main body does not have a redundant length with respect to the grip section main body portion. Therefore, while an occurrence of a wrinkle or a slack is suppressed and the covering member main body is fixed to the grip section main body portion, it is possible to reduce positions such as notches for adjusting the length, at which it is not possible to perform layout of the element to be held in the covering member main body, and it is possible to perform the layout of the element to be held on the grip section in a wider range.

In the steering wheel according to the second aspect, since the steering wheel covering member according to the first aspect covers, is wrapped around, and is fixed to the grip section main body portion of the grip section, it is possible to suppress the wrinkle or the slack and improve the appearance, and it is possible to perform layout of the element to be held on the grip section in the wider range.

In the steering wheel according to the third aspect, in addition to an effect of the steering wheel according to the second aspects, the adhesive is set on at least any one of the covering member main body and the grip section main body portion in the region excluding the position corresponding to the outer circumferential side of the grip section main body portion. In this manner, it is possible to reliably fix the covering member main body to the grip section main body portion with the adhesive, extension of the covering member main body is unlikely to be hindered because the covering member main body does not easily adhere to the grip section main body portion when the covering member main body is wrapped around the grip section main body portion on the outer circumferential side while the covering member main body extends.

In the method for manufacturing a steering wheel according to the fourth aspect, the steering wheel covering member is fixed to the grip section main body portion formed along the arc, the steering wheel covering member having the covering member main body that has the extensibility, the length in the longitudinal direction, in the natural length, which is set to have the corresponding relationship with the inner circumferential-side length of the grip section main body portion, and both of the end portions in the longitudinal direction, which are disposed to be matched with the positions corresponding to the recessed portions of the grip section main body portion. The wrapping start of the one edge portion of the covering member main body is performed along the inner circumferential side of the grip section main body portion, the covering member main body extends to be wrapped around at a position of the grip section main body portion on the outer circumferential side, and the wrapping end of the other edge portion of the covering member main body is performed on the inner circumferential side of the grip section main body portion. While the covering member main body is reliably positioned on the grip section main body portion by using the recessed portions, the covering member main body does not have a redundant length with respect to the grip section main body portion. Therefore, while the occurrence of the wrinkle or the slack is suppressed and the steering wheel covering member is fixed to the grip section main body portion, it is possible to reduce positions such as notches for adjusting the length, at which it is not possible to perform layout of the element to be held in the covering member main body, and it is possible to perform the layout of the element to be held on the grip section in the wider range.

In the method for manufacturing a steering wheel according to the fifth aspect, in addition to effects of the method for manufacturing a steering wheel according to the fourth aspect, the adhesive is set on at least any one of the covering member main body and the grip section main body portion in the region excluding the position corresponding to the outer circumferential side of the grip section main body portion. In this manner, it is possible to reliably fix the covering member main body to the grip section main body portion with the adhesive, extension of the covering member main body is unlikely to be hindered because the covering member main body does not easily adhere to the grip section main body portion when the covering member main body is wrapped around the grip section main body portion on the outer circumferential side while the covering member main body extends.

BRIEF DESCRIPTION OF DRAWINGS

FIG. 6A1 is a perspective view schematically showing a state in which, in a method for manufacturing the steering wheel, a covering member main body extends on an outer circumferential side by performing a wrapping start on an inner circumferential side of the grip section main body portion, FIG. 6A2 is a perspective view schematically showing a state in which, in the method for manufacturing the steering wheel, the covering member main body is wrapped around the grip section main body portion, FIG. 6B1 is a sectional view of a position corresponding III-III in FIG. 6A1, and FIG. 6B2 is a sectional view of a position corresponding IV-IV in FIG. 6A2.

DESCRIPTION OF EMBODIMENTS

Hereinafter, a configuration of an embodiment according to the present invention will be described with reference to the drawings.

Figure 4:
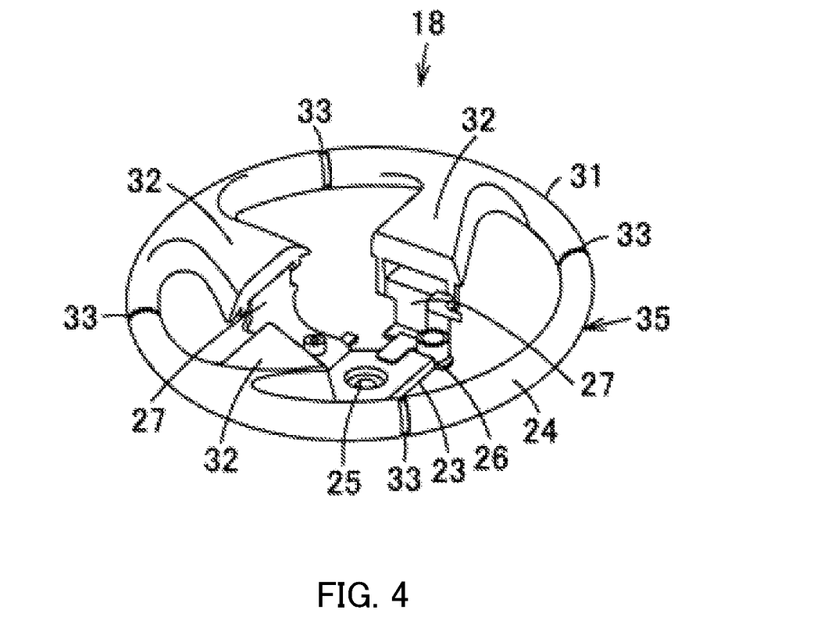
FIG. 4 is a perspective view showing a part of a steering wheel.
Figure 5A:
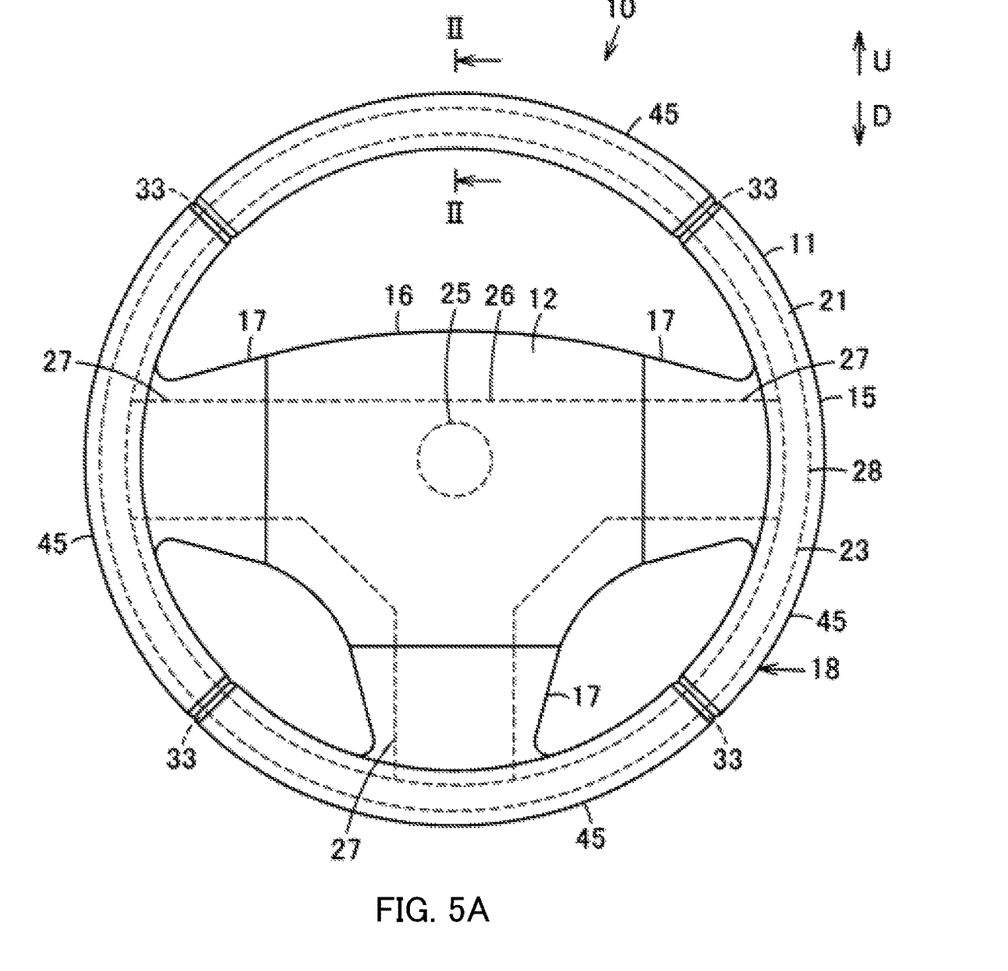
FIG. 5A is a plan view showing the steering wheel.
Figure 5B:
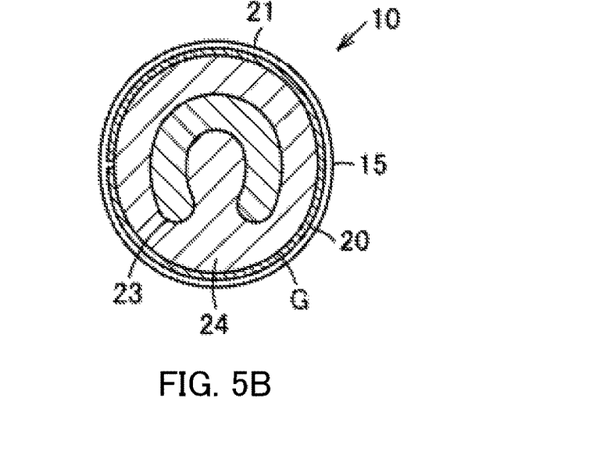
FIG. 5B is a sectional view of a position corresponding to II-II in FIG. 5A.

In FIGS. 4, 5A, and 5B, reference sign 10 represents a steering wheel of an automobile as a vehicle, for example. Steering wheel 10 includes steering wheel main body 11, pad body 12 which is mounted on an occupant side of steering wheel main body 11, or the like. Steering wheel 10 is mounted on a steering shaft provided in a vehicle in a state of being inclined normally; however, hereinafter, when steering wheel 10 is viewed from a side of a driver (occupant), an arrow U direction is described as an upper side, an arrow D direction is described as a lower side, a front side, that is, a side of a front glass on an upper front side, of the vehicle is described as the front side or a back surface side, and a rear side, that is, a lower rear side, of the vehicle is described as the rear side, a near side, or a front surface side.

In this manner, steering wheel main body 11 is configured to include a rim section (grip section) 15 as a grip section, boss section 16 that is positioned on an inner side of rim section 15, and a plurality of spoke sections 17 that connects rim section 15 and boss section 16; here, in the embodiment, three spoke sections 17 are provided. In addition, steering wheel main body 11 has steering wheel base section 18. In addition, steering wheel main body 11 has steering covering member 20 (hereinafter, simply referred to as covering member 20) as a steering wheel covering member. Further, steering wheel main body 11 has outer skin section 21. In this manner, steering wheel main body 11 has a cover body not shown.

Rim section 15 is a part that is gripped and operated by a driver (occupant). At least a part of rim section 15 is formed along an arc. In the embodiment, rim section 15 is formed into an annular shape. Hereinafter, sections of steering wheel main body 11 are disposed on the right, left, top and bottom sides with a (neutral) position of steering wheel 10 as a reference.

Steering wheel base section 18 has cored bar 23 and resin layer 24 that is covered with covering member 20 that covers a part of cored bar 23.

Cored bar 23 is made of metal and includes substantially cylindrical boss 25 having a serration structure of intermeshing with the steering shaft on the back surface side which is a vehicle body side of boss section 16, and boss plate 26 that configures the cored bar is integrally fixed to boss 25. In this manner, spoke cored bar section 27 corresponding to spoke section 17 is formed to be integrally connected from boss plate 26. Further, rim cored bar section 28 as a grip section cored bar corresponding to rim section 15 is fixed to spoke cored bar section 27 of spoke section 17.

Spoke cored bar section 27 is radially provided. Spoke cored bar section 27 may not need to correspond to all of spoke sections 17, or a part of spoke section 17 may be configured to have a finisher or a cover body without having spoke cored bar section 27. In the embodiment, spoke cored bar section 27 projects from right, left, and lower portions of boss plate 26 and each of the spoke cored bar section is connected to rim cored bar section 28.

Rim cored bar section 28 configures a part of rim section 15. Rim cored bar section 28 is formed in a shape corresponding to a shape of rim section 15. That is, rim cored bar section 28 is formed into an annular shape depending on the shape of rim section 15; for example, at least a part of the rim cored bar section is formed along an arc. In the embodiment, rim cored bar section 28 is formed into an annular shape.

Resin layer 24 is formed to cover at least rim cored bar section 28. In the embodiment, resin layer 24 is formed to cover entire rim cored bar section 28 and a part of spoke cored bar section 27, for example. To be more specific, resin layer 24 is provided with rim covering section 31 as a grip section covering portion, which covers rim cored bar section 28 at the position of rim section 15, and spoke covering section 32 that covers a region having a predetermined distance from an end portion that is connected to rim cored bar section 28 of spoke cored bar section 27 at the position of spoke section 17, the rim covering section and the spoke covering section being integrally provided. In addition, resin layer 24 is formed to have a substantially circular cross section, for example. In this manner, resin layer 24 is made of a resin obtained by performing fine foaming on soft foaming polyurethane resin. In addition, resin layer 24 is provided with recessed portion 33 that is an outer skin splitting portion for fixing a part of outer skin section 21. In this manner, resin layer 24 is formed by using a forming mold (die) not shown. The mold includes one half mold and the other mold, schematically, and a cavity that is formed between the one half mold and the other half mold is filled with a synthetic resin raw material.

Rim covering section 31 configures rim cored bar section 28 and rim section main body portion 35 as a grip section main body portion that configures rim section 15. That is, resin layer 24 configures cored bar 23 and rim section main body portion 35. At least a part of rim section main body portion 35 is formed along an arc. In the embodiment, rim section main body portion 35 is formed into an annular shape.

Spoke covering section 32 is connected to rim covering section 31 and projects from rim covering section 31 on a side of spoke cored bar section 27. In the embodiment, spoke covering section 32 is formed at a position corresponding to right and left spoke sections 17 (spoke cored bar section 27), for example.

Recessed portion 33 is formed in rim section main body portion 35 in a direction intersecting the arc (circumference) of rim section main body portion 35. At least a part of recessed portion 33 is positioned on the rear side (front surface side) which as an occupant side on a front surface of resin layer 24 (rim section main body portion 35). A plurality (in the embodiment, four) recessed portions 33 are formed and positioned to be separated from each other in a circumferential direction of rim section main body portion 35. For example, recessed portions 33 are disposed at equal intervals (substantially intervals) in the circumferential direction of rim section main body portion 35. In addition, the recessed portions 33 are each disposed in both side portions on an upper side and both side portions on a lower side. For example, recessed portions 33 may be formed at the same time as when resin layer 24 is formed by the forming mold or may be formed by performing processing after resin layer 24 is molded.

Since covering member 20 shown in FIGS. 1A to 3 and 5B is referred to as a steering mat or the like, the covering member is disposed from a position to cover rim cored bar section 28 of resin layer 24, that is, rim covering section 31, to a position to cover a part of spoke cored bar section 27, that is, spoke covering section 32.

Figure 1A:
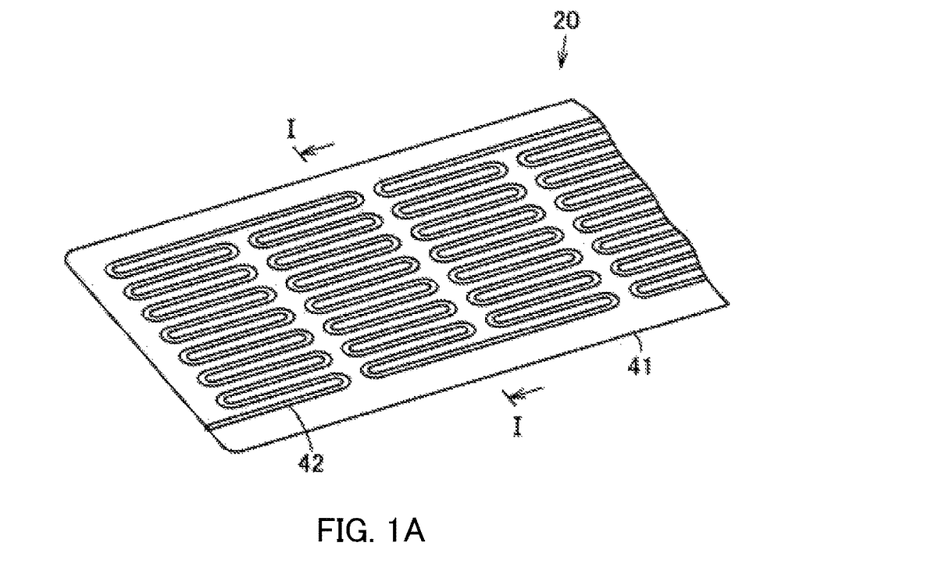
FIG. 1A is a perspective view showing a steering wheel covering member of an embodiment of the present invention.
Figure 1B:
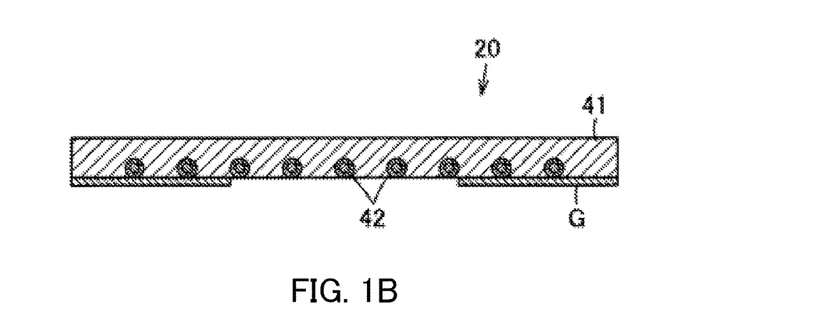
FIG. 1B is a sectional view of a position corresponding to I-I in FIG. 1A.

Covering member 20 includes sheet member (mat portion) 41 as a covering member main body formed into a sheet shape and wire 42 held as an element to be held that is held by sheet member 41. Further, covering member 20 covers a front surface of resin layer 24 (rim section main body portion 35) and is bonded to be fixed to the front surface of resin layer 24 (rim section main body portion 35) with adhesive G (FIG. 1B). In the embodiment, covering member 20 is a heater unit for adjusting a temperature of rim section 15, for example. That is, wire 42 of covering member 20 of the embodiment is a heater line (heating wire) which generates heat when energized and configures a heating circuit formed by a temperature sensor, or the like.

Sheet member 41 has extensibility. For example, sheet member 41 has a predetermined extension ratio and extends in a ratio of 10% to 15% in the embodiment. Sheet member 41 can be formed of any material; however, in the embodiment, the sheet member is formed of a synthetic resin such as vinyl chloride. In addition, a thickness of sheet member 41 can be set to any value; however, in the embodiment, the thickness is set to 1.0 mm or less with consideration for performance of covering member 20 as the heater unit. In the embodiment, sheet member 41 is integrally provided with a first covering portion that covers rim covering portion 31 (rim section main body portion 35) and a second covering portion that projects from the first covering portion and covers a part of spoke covering portion 32; however, the drawings only shows the first covering portion, and second covering portion is omitted in the drawing. Sheet member 41 (first covering portion) is formed into a rectangular shape. Longitudinal dimension L1 which is a length of a long side of sheet member 41 (first covering portion) in a natural length is set to a length having a corresponding relationship with an inner circumferential-side length of rim section main body portion 35 (rim covering portion 31 of resin layer 24). In addition, short dimension L2 which is a length of a short side of sheet member 41 (first covering portion) in a natural length is set as a radial dimension (meridian (small diameter) dimension) of rim section main body portion 35 (rim covering portion 31 of resin layer 24), that is, a dimension in a circumferential direction of a cross section thereof, or is formed to be equal (substantially equal) to a dimension in a meridian direction in a range to be warmed.

Here, longitudinal dimension L1 of sheet member 41 (first covering portion) is set to the length having the corresponding relationship with the inner circumferential-side length of rim section main body portion 35 (rim covering portion 31 of resin layer 24). This means that longitudinal dimension L1 is set with the inner circumferential-side length as a reference. Specifically, longitudinal dimension L1 of sheet member 41 (first covering portion) is set to be equal (substantially equal) to a dimension obtained by adding depths and inner circumferential-side lengths of recessed portions 33 to an inner circumferential-side length of a part of rim section main body portion 35 (rim covering portion 31 of resin layer 24) excluding recessed portions 33.

Sheet member 41 may be formed by joining through sewing or the like of sheet member pieces as a plurality of covering member main body pieces in the longitudinal direction.

Wire 42 is a functional part configured to be directly connected to a control circuit, a power supply, or the like not shown or to be indirectly connected thereto via a power receiving section or the like and, in the embodiment, to cause covering member 20 to perform detection when being energized or generate heat depending on the temperature of rim section 15. Wire 42 can be disposed at any position; however, in the embodiment, the wire is disposed to meander in a wavy shape (FIG. 1A). That is, wire 42 is disposed to occupy a region having a predetermined plane shape with respect to sheet member 41. A length (circuit length) of wire 42 is set depending on performance of covering member 20 as the heater unit or a shape of rim section main body portion 35 (rim covering portion 31). In addition, a position of wire 42 on sheet member 41 can be set to any position; however, regarding an external appearance quality, it is preferable to set the wire inside sheet member 41 or on a side of rim section main body portion 35 (resin layer 24 (rim covering portion 31)) of sheet member 41. Further, wire 42 is disposed at a position excluding recessed portion 33 on rim section main body portion 35 (rim covering portion 31 of resin layer 24). For example, wires 42 are disposed one by one on sheet member pieces that configure sheet member 41, and a plurality of wires are disposed to be separated from each other by joining the sheet member pieces in the longitudinal direction. Therefore, the wires 42 are disposed to be separated from each other at a plurality of positions of sheet member 41 in the longitudinal direction, that is, four positions in the embodiment, and are disposed to be separated from both end portions in the longitudinal direction and both side portions in the longitudinal direction (both end portions in a transverse direction) of sheet member 41. Hence, sheet member 41 (first covering portion) is provided with falling-in portion 41a that falls in recessed portion 33 between adjacent wires 42 and 42, and both end portions 41b and 41b in the longitudinal direction are portions that fall in recessed portion 33. In other words, joining portions of the sheet member pieces that configure sheet member 41 become falling-in portions 41a, respectively. In the embodiment, falling-in portions 41a are formed at three positions. In addition, dimension L3 of falling-in portions 41a in the longitudinal direction of sheet member 41 is set to have a corresponding relationship with the dimension of recessed portions 33. For example, dimension L3 of falling-in portions 41a is set to be equal (substantially equal) to a dimension obtained by adding depths and inner circumferential-side lengths of recessed portions 33 to dimension L4 of end portion 41b in the longitudinal direction of sheet member 41. In addition, in the embodiment, dimension L4 of end portion 41b of sheet member 41 (first covering portion) is set to be equal (substantially equal) to dimension L5 of side portion (end portion in the transverse direction) 41c which is an edge portion in the transverse direction of sheet member 41, for example.

Figure 2:
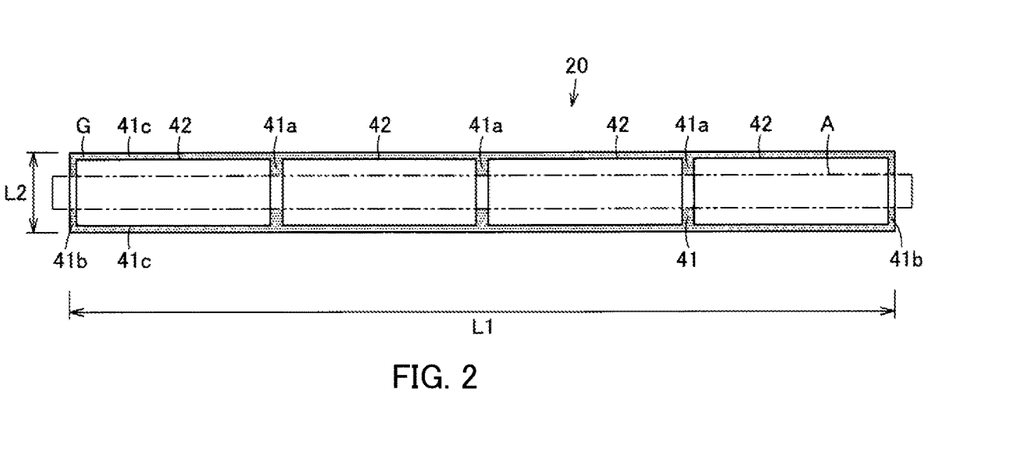
FIG. 2 is a plan view of the steering wheel covering member.
Figure 3:
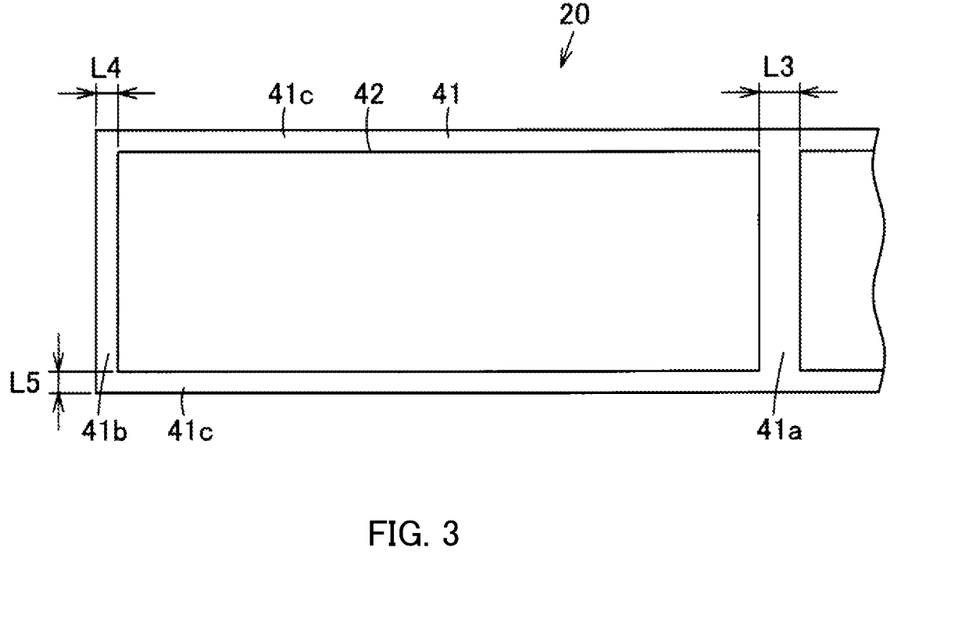
FIG. 3 is an enlarged plan view showing a part of the steering wheel covering member.

Adhesive G shown in FIGS. 1B, 2, and 5B is to cause covering member 20 to adhere to and be fixed to resin layer 24 (rim section main body portion 35). Adhesive G is set to be on at least any one of covering member 20 and resin layer 24 (rim section main body portion 35). In the embodiment, adhesive G is set on a rear surface side of sheet member 41 of covering member 20, that is, on a side of rim section main body portion 35, in advance. In addition, adhesive G is not set at a position (region A) corresponding to the outer circumferential side of rim section main body portion 35, but is set in a region (hatched part in FIG. 2) excluding region A. Hence, adhesive G is set along both side portions 41c and 41c of sheet member 41.

Outer skin section 21 shown in FIGS. 5A and 5B is a part that is directly gripped by the driver (occupant) and is a decorative part of steering wheel 10. Outer skin section 21 is formed of leather such as natural leather or synthetic leather, a synthetic resin, or the like into a sheet shape. Outer skin section 21 covers covering member 20 and is attached to rim section main body portion 35. For example, outer skin section 21 is disposed to cover covering member 20 and to continuously cover the entire front surface of rim section main body portion 35. In the embodiment, both end portions of a plurality outer skin pieces 45 are joined by sewing or the like of each other to be integrally formed, and joining portions of the outer skin pieces fall in the positions of recessed portions 33, respectively, such that outer skin section 21 configures a so-called grain-patterned design on the driver (occupant) side of rim section 15. That is, in the embodiment, outer skin section 21 is formed by four outer skin pieces 45.

The cover body is also referred to as a back cover, a lower cover, or a body cover, is formed of a synthetic resin or the like, and covers a lower portion of boss section 16.

As pad body 12, it is possible to use an airbag apparatus or a housing that houses an impact absorber, for example. Pad body 12 may be integrally assemble a horn switch mechanism as a switch apparatus.

In this manner, when steering wheel 10 is manufactured, cored bar 23 that has been formed in advance is set in the forming mold, and then a synthetic resin raw material is agitated and mixed to be injected into a cavity of the forming mold, in which the cavity is formed by combining (mold closing) one half mold and the other mold. As a result, reaction of the synthetic resin raw material is performed with foaming such that polyurethane is obtained and flows toward a flow terminal.

Subsequently, a first intermediate body formed with resin layer 24 covering rim cored bar section 28 in the cavity is released from the forming mold through mold opening of the one half mold and the other half mold, and burr or the like is cut.

Figure 6A:
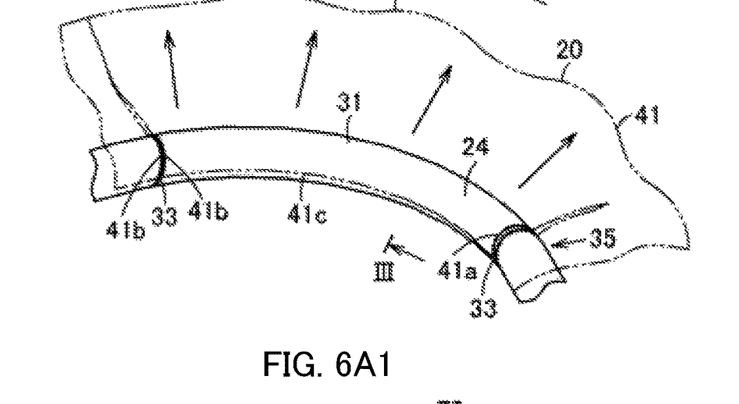

Further, covering member 20 that is separately formed adheres to be fixed to the front surface of resin layer 24 (rim section main body portion 35) of the first intermediate body. In this case, covering member main body pieces (sheet member pieces) are joined to each other in the longitudinal direction in advance such that covering member 20 is formed to have a longitudinal shape. As shown in FIG. 6A1, position matching is performed by causing both end portions 41b and 41b of sheet member 41 in the longitudinal direction to fall in one recessed portion 33, and one side portion 41c of sheet member 41 is fixed to an inner circumferential side of rim covering portion 31 (rim section main body portion 35) of resin layer 24 with adhesive G. Falling-in portions 41a fall in to be fixed to the rest of recessed portions 33, respectively. Longitudinal dimension L1 of side portion 41c of sheet member 41 is set to have a corresponding relationship with the inner circumferential-side length of rim section main body portion 35 and to be equal (substantially equal) to a dimension obtained by adding the depths and the inner circumferential-side lengths of recessed portions 33 to the inner circumferential-side length of the part of rim section main body portion 35 (rim covering portion 31 of resin layer 24) excluding recessed portions 33. Hence, one side portion 41c of sheet member 41 is fixed to the inner circumferential side of rim covering portion 31 (rim section main body portion 35) without substantial extension.

Figure 6A:
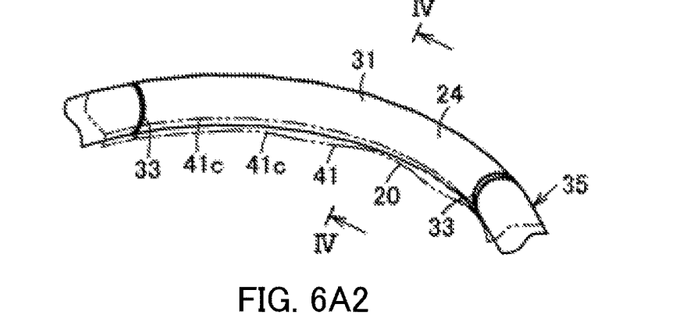
Figure 6B:
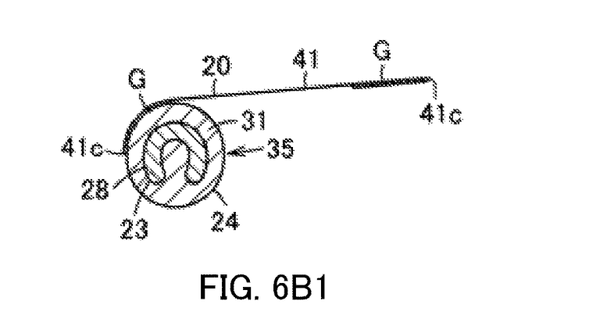

Subsequently, sheet member 41 is wrapped around rim section main body portion 35 on the outer circumferential side in the meridian direction with the inner circumferential side of rim section main body portion 35 as a wrapping start, while the side of the other side portion 41c is stretched (FIGS. 6A1 and 6B1). In this case, since adhesive G is not set at a position corresponding to the outer circumferential side of rim section main body portion 35, it is possible to wrap sheet member 41 around rim section main body portion 35 on the outer circumferential side while a wrinkle or the like is stretched. In addition, sheet member 41 can extend between respective positions between recessed portions 33 and 33, that is, between falling-in portions 41a and 41a or between falling-in portion 41a and end portion 41b.

Figure 6B:
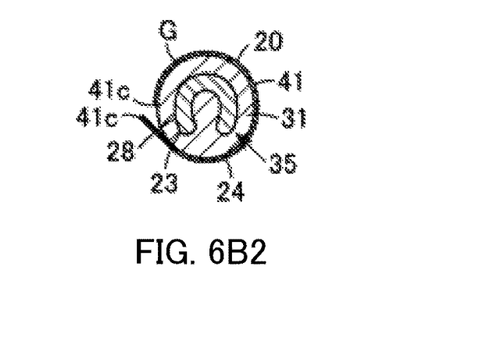

In this manner, sheet member 41 is wrapped until the side of the other side portion 41c thereof is positioned on the inner circumferential side of rim section main body portion 35 and is fixed on the inner circumferential side of rim covering portion 31 (rim section main body portion 35) of resin layer 24 with adhesive G in the vicinity of one side portion 41c with the inner circumferential side as a wrapping end (FIGS. 6A2 and 6B2). Longitudinal dimension L1 of side portion 41c of sheet member 41 is set to have a corresponding relationship with the inner circumferential-side length of rim section main body portion 35 and to be equal (substantially equal) to a dimension obtained by adding the depths and the inner circumferential-side lengths of recessed portions 33 to the inner circumferential-side length of the part of rim section main body portion 35 (rim covering portion 31 of resin layer 24) excluding recessed portions 33. Hence, one side portion 41c of sheet member 41 is fixed to the inner circumferential side of rim covering portion 31 (rim section main body portion 35) without substantial extension. As a result, covering member 20 is wrapped around rim section main body portion 35 and fixed thereto without causing a wrinkle or a slack in sheet member 41. Adhesive G is spread when covering member 20 and rim section main body portion 35 (rim covering portion 31) are brought into press contact with each other during fixing of the covering member, and it is also possible to fill a part corresponding to a portion (region A in FIG. 2), to which adhesive G is not set, with adhesive G. That is, adhesive G is not additionally applied during wrapping of covering member 20.

Then, covering member 20 is further covered with outer skin section 21. In this case, outer skin section 21 is joined by sewing or the like of the end portions of a plurality of outer skin pieces to each other in advance and has the same longitudinal shape as that of covering member 20. Thus, joining portions fall in recessed portions 33, respectively, and both end portions are joined by sewing or the like at a position corresponding to one recessed portion 33. Hence, the outer skin section can fall in to be fixed to recessed portion 33 and can fall in to be fixed to recessed portion 33 while outer skin pieces are joined at the position of recessed portion 33.

Steering wheel main body 11 electrically connects the functional parts of covering member 20 to the control circuit, and pad body 12 or the cover body is attached such that steering wheel 10 is completed (FIG. 4).

As described above, according to the embodiment, when sheet member 41 has the extensibility and has the length, in the natural length, which is set to have the corresponding relationship with the inner circumferential-side length of rim section main body portion 35, thereby, being wrapped around and fixed to rim section main body portion 35, both end portions 41*b* and 41*b* of sheet member 41 in the longitudinal direction are disposed to be matched with the positions corresponding to recessed portions 33 of rim section main body portion 35. The wrapping start of side portion 41*c* which is one edge portion of the sheet member is performed along the inner circumferential side of rim section main body portion 35, sheet member 41 extends to be wrapped around at a position of rim section main body portion 35 on the outer circumferential side, and the wrapping end of the other edge portion of sheet member 41 is performed on the inner circumferential side of rim section main body portion 35. While sheet member 41 is reliably positioned on rim section main body portion 35 by using recessed portions 33, sheet member 41 does not have a redundant length with respect to rim section main body portion 35. Therefore, while the occurrence of the wrinkle or the slack is suppressed and covering member 20 is fixed to rim section main body portion 35, it is possible to reduce positions such as notches for adjusting the length, at which it is not possible to perform layout of wire 42 in sheet member 41, and it is possible to perform the layout of wire 42 on rim section 15 in the wider range.

In addition, since sheet member 41 can extend in portions split between recessed portions 33 and 33 which are used as positioning portions, it is possible to more reduce an extension error and it is possible to suppress the occurrence of the wrinkle or the slack more efficiently, compared with a case where entire sheet member 41 extends at once.

Since covering member 20 covers, is wrapped around, and is fixed to rim section main body portion 35 of rim section 15, it is possible to suppress the wrinkle or the slack and improve the appearance, and it is possible to perform the layout of wire 42 on rim section 15 in the wider range and cause the wire perform a function thereof. In the embodiment, it is possible to warm the wide range of rim section 15 by wire 42.

In addition, adhesive G is set on at least any one of sheet member 41 and rim section main body portion 35 in the region excluding the position corresponding to the outer circumferential side of rim section main body portion 35. In this manner, it is possible to reliably fix sheet member 41 to rim section main body portion 35 with adhesive G, extension of sheet member 41 is unlikely to be hindered because sheet member 41 does not easily adhere to rim section main body portion 35 when sheet member 41 is wrapped around rim section main body portion 35 on the outer circumferential side while sheet member 41 extends.

Further, since covering member 20 is positioned and fixed by using recessed portions 33 for configuring a design by joining and falling-in of the end portions of outer skin section 21 to each other, there is no need to perform another process for forming a positioning portion of covering member 20, and thus manufacturability is unlikely to deteriorate.

In the embodiment described above, covering member 20 may be a sensor unit that has, as the element to be held, a sensor circuit (a pressure sensor, an electric capacity sensor, or the like) that is to check that the occupant grips rim section 15, for example. In this case, wire 42 functions as a detector of a sensor.

Further, the element to be held is not limited to wire 42, and it is possible to use any functional part that configures a circuit section such as a heater circuit or a sensor circuit, for example. In addition, as the element to be held, it is possible to use a magnet (Massage Magnet), a decorative member, or the like other than the circuit section.

In addition, longitudinal dimension L1 of sheet member 41 (first covering portion) is set to be slightly longer than the inner circumferential-side length of rim section main body portion 35 (rim covering portion 31 of resin layer 24); however, the longitudinal dimension may be set to be slightly shorter with the inner circumferential-side length as a reference. In this case, when covering member 20 is wrapped around and is fixed to rim section main body portion 35, the wrapping start is performed along the inner circumferential side of rim section main body portion 35 while side portion 41*c* of sheet member 41 is slightly extended, and thereby it is possible to achieve the same operational effects.

Further, it is possible to set any number of recessed portions 33 at any positions depending on a design or the like of steering wheel 10.

In addition, steering wheel 10 is not limited to the configuration in which three spoke sections 17 are provided, and can have a configuration in which two, four, or more spoke sections 17 are provided.

Further, rim section 15 may have the entirety or a part of the annular shape as long as the rim section has the arc shape. That is, rim section 15 may not have the annular shape as long as the rim section has the arc shape.

In this manner, steering wheel 10 can be used as the steering wheel for steering not only the vehicle such as the automobile but also any vehicle.

INDUSTRIAL APPLICABILITY

The present invention can be preferably used as a steering mat used for a steering wheel of an automobile such as an electric vehicle, for example, a steering wheel including the steering mat, and a method for manufacturing the steering wheel.

REFERENCE SIGNS LIST

10 Steering wheel
15 Rim section as grip section
20 Steering covering member
33 Recessed portion
35 Rim section main body portion as grip section main body portion
41 Sheet member as covering member main body
42 Wire as element to be held
G Adhesive

The invention claimed is:

1. A steering wheel covering member that is wrapped around and fixed to a grip section main body portion which is formed along an arc and has recessed portions formed in a direction intersecting the arc and that configures a grip section of a steering wheel, which is gripped and operated by a driver, in cooperation with the grip section main body portion, the steering wheel covering member comprising:
a covering member main body; and
an element to be held that is held by the covering member main body,
wherein the covering member main body has a length in a longitudinal direction which is set equal to a dimension obtained by adding depths and inner circumferential-side lengths of the recessed portions to an inner circumferential-side length of a part of the grip section main body portion excluding the recessed portions, has extensibility, and has both edges in the longitudinal direction disposed at the recessed portions.

2. A steering wheel having a grip section that is gripped and operated by a driver, wherein the grip section includes:
   a grip section main body portion that is formed along an arc and has recessed portions in a direction intersecting the arc, and
   the steering wheel covering member according to claim 1 which covers, is wrapped around, and is fixed to the grip section main body portion.

3. The steering wheel according to claim 2, wherein an adhesive is set on at least one of the covering member main body and the grip section main body portion in a region excluding a position corresponding to an outer circumferential side of the grip section main body portion and fixes the covering member main body.

4. A method for manufacturing a steering wheel that includes a grip section main body portion formed along an arc and has recessed portions formed in a direction intersecting the arc, a covering member main body having a length in a longitudinal direction which is set equal to a dimension obtained by adding depths and inner circumferential-side lengths of the recessed portions to an inner circumferential-side length of a part of the grip section main body portion excluding the recessed portions and having extensibility, and a steering wheel covering member having an element to be held that is held by the covering member main body, the method comprising:

matching positions of edges of the covering member main body in the longitudinal direction with recessed portions formed in the grip section main body portion in a direction intersecting the arc; and wrapping the covering member main body around the grip section main body portion from a wrapping start on an inner circumferential side of the grip section main body portion to a wrapping end on the inner circumferential side thereof while the covering member main body extends on an outer side thereof and fixing the steering wheel covering member to the grip section main body portion.

5. The method for manufacturing a steering wheel according to claim 4, further comprising:

setting an adhesive for fixing the covering member main body on at least any one of the covering member main body and the grip section main body portion in a region excluding a position corresponding to an outer circumferential side of the grip section main body portion.

* * * * *